March 23, 1926.
I. C. BOUTWELL
NUT LOCK
Filed Jan. 27, 1925
1,577,946
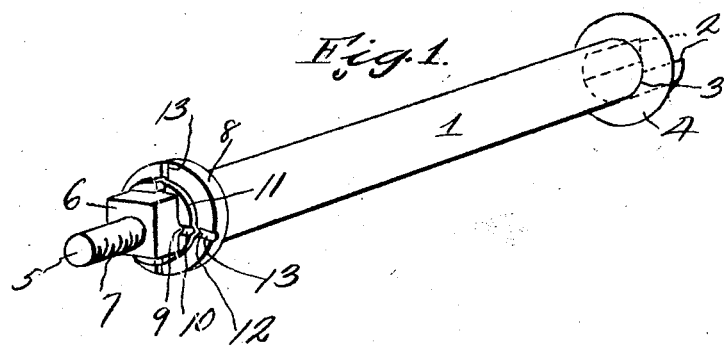
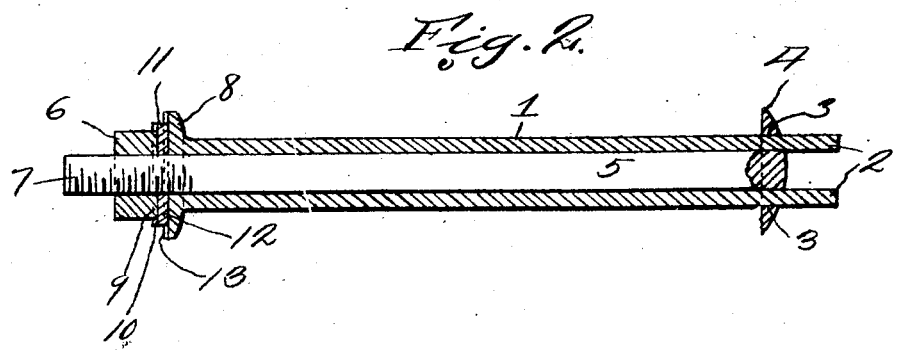
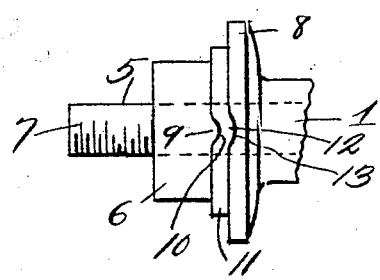
Inventor
I. C. Boutwell
By D. Swift
Attorney Patented Mar. 23, 1926.                                    1,577,946

UNITED STATES PATENT OFFICE.

ISAAC CHAP BOUTWELL, OF GRADY, ALABAMA.

NUT LOCK.

Application filed January 27, 1925. Serial No. 5,167.

*To all whom it may concern:*

Be it known that I, ISAAC CHAP BOUTWELL, a citizen of the United States, residing at Grady, in the county of Montgomery, State of Alabama, have invented a new and useful Nut Lock; and I do hereby declare the following to be a full, clear, and exact description of the invention, such as will enable others skilled in the art to which it appertains to make and use the same.

The invention relates to bolts particularly what is known as a case bolt, and has for its object to provide a device of this character comprising a cylindrical casing through which a bolt extends having its head engaging one end of the casing and fingers extending through apertures in the head. The other end of the bolt has threaded thereon a nut, which nut cooperates with a washer engaging an annular flange carried by the other end of the casing, and interengaging means comprising rings and depressions carried by the nut, washer and annular flange of the casing for preventing rotation of the nut and washer, and the rotation of the bolt is prevented by the fingers which extend through the apertures in the head of the bolt.

A further object is to provide a case bolt comprising a casing, a bolt extending through the casing and having a nut and washer thereon and interengaging means between all of said parts for holding said parts against rotation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the bolt.

Figure 2 is a vertical longitudinal sectional view through the bolt.

Figure 3 is an enlarged side elevation of one end of the bolt.

Referring to the drawing, the numeral 1 designates the cylindrical casing of the bolt, which casing adjacent one of its ends is provided with oppositely disposed fingers 2, which extend through apertures 3 in the head 4 of the bolt, therefore it will be seen that the casing 1 will be positively held against rotation on the bolt shank 5 which extends through the casing, and at the same time by having the fingers 2 elongated a range of adjustability to the nut 6, which is threaded on a threaded end 7 of the bolt shank 5 is possible, for clamping an article between the head 4 of the bolt and the flange 8 carried by the other end of the cylindrical member 1, and which flange is formed integral with the casing 1. It has been found, especially in railroad construction, that nuts 6 easily work loose incident to vibration, which vibration, either imparts a retrograde rotation on the nut 6 or the bolt 5, however it will be seen that by providing the fingers 2, the cylindrical casing 1 and bolt 5 will be prevented from rotation, except as a unit.

The inner side of the nut 6 is provided with radially disposed ribs 9, which ribs, during the tightening of the nut, are received in radially disposed channels 10 of the washer 11, and which washer is in turn provided with radially disposed ribs 12 which are received in the channels 13, carried by the end flange 8 of the casing 1, therefore it will be seen that the nut 6 will be positively locked against rotation except when considerable power is applied thereto by a wrench. However ordinary vibration will not cause retrograde movement of the nut 6 or washer 11.

From the above it will be seen that a case bolt is provided which is simple in construction, the parts reduced to a minimum and one wherein the nut as well as the bolt is positively held against rotation incident to vibrations and the like.

The invention having been set forth what is claimed as new and useful is:—

1. A nut lock comprising an elongated cylindrical member, a bolt extending through said cylindrical member, a head carried by said bolt and engaging one end of the cylindrical member, oppositely disposed fingers carried by one end of the cylindrical member and extending through apertures in the head of the bolt, a flange carried by the other end of the cylindrical member, a washer disposed on the bolt and engaging the flange, a nut threaded on the bolt and engaging the washer and interengaging means carried by the flange, the washer and the nut.

2. A lock nut comprising a bolt having a cylindrical sleeve thereon, a head engaging one end of the sleeve, means for locking said sleeve to the bolt, said means comprising fingers carried by the sleeve and extending through apertures in the head of the bolt, a nut threaded on said bolt, a washer interposed between the nut and the end of the sleeve, radially disposed ribs carried by the nut and washer and interengaging in channels of the washer and the end of the sleeve.

In testimony whereof I have signed my name to this specification.

ISAAC CHAP BOUTWELL.